US012624661B2

(12) United States Patent
Nath et al.

(10) Patent No.: US 12,624,661 B2
(45) Date of Patent: *May 12, 2026

(54) ACOUSTIC DAMPING DEVICE

(71) Applicant: General Electric Company, Evendale, OH (US)

(72) Inventors: Hiranya Kumar Nath, Bengaluru (IN); Ravindra Shankar Ganiger, Bengaluru (IN); Kwanwoo Kim, Cincinnati, OH (US); Dharmaraj Pachaiappan, Bengaluru (IN); Vivekta Sharma, Bengaluru (IN)

(73) Assignee: GENERAL ELECTRIC COMPANY, Evendale, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/907,020

(22) Filed: Oct. 4, 2024

(65) Prior Publication Data

US 2025/0237172 A1    Jul. 24, 2025

Related U.S. Application Data

(63) Continuation of application No. 18/420,337, filed on Jan. 23, 2024, now Pat. No. 12,134,986.

(51) Int. Cl.
*F02C 7/24*    (2006.01)

(52) U.S. Cl.
CPC ...................................... *F02C 7/24* (2013.01)

(58) Field of Classification Search
CPC .......... B64D 2033/0206; F23M 20/005; F02C 7/045; F02C 7/24; F23R 2900/00014;
(Continued)

(56) References Cited

U.S. PATENT DOCUMENTS

| | | |
|---|---|---|
| 2,094,457 A | 9/1937 | Lattner |
| 3,556,159 A | 1/1971 | Bleasdale |

(Continued)

FOREIGN PATENT DOCUMENTS

CN        109073221 A    12/2018

OTHER PUBLICATIONS

El Ouahabi et al., "Experimental Investigation of the Acoustic Black Hole for Sound Absorption in Air," ICSV22, dated Jul. 12-16, 2015, 9 pages.

(Continued)

*Primary Examiner* — Rodolphe Andre Chabreyrie
(74) *Attorney, Agent, or Firm* — Venable LLP; Duarte Y Ho; Michele V. Frank

(57)        ABSTRACT

Systems, apparatus, articles of manufacture, and methods are disclosed for an acoustic damping device. An example apparatus includes a first channel defining a first volume, the first channel open on a first end and closed on a second end, a second channel surrounding the first channel and defining a second volume, and a plurality of discs oriented within the first channel, respective discs of the plurality of discs including an opening in a center of the respective disc to allow at least one of a fluid or acoustic oscillation to move from the first end to the second end, the first channel including a plurality of apertures dispersed along an outer wall of the first channel and between the plurality of discs, the apertures to facilitate transfer of at least one of the fluid or the acoustic oscillation from the first channel to the second channel.

20 Claims, 11 Drawing Sheets

(58) Field of Classification Search
CPC ................. F02K 1/827; F05D 2260/96; F05D 2260/963; F05D 2260/962; G10K 11/04; F01N 1/02; F01N 1/003
See application file for complete search history.

(56) References Cited

U.S. PATENT DOCUMENTS

| | | | |
|---|---|---|---|
| 6,901,964 | B2 | 6/2005 | Kippe et al. |
| 7,493,892 | B1 | 2/2009 | Sims, Jr. et al. |
| 7,694,664 | B1 | 4/2010 | Sims, Jr. |
| 10,731,784 | B2 | 8/2020 | Schini et al. |
| 10,808,874 | B2 | 10/2020 | Samarasinghe et al. |
| 10,876,506 | B2 | 12/2020 | Benanti et al. |
| 11,946,398 | B1 * | 4/2024 | Le ......................... F04D 29/665 |
| 2008/0216481 | A1 | 9/2008 | Pollarolo |
| 2016/0177836 | A1 * | 6/2016 | Wickström ............... F02C 7/22 60/734 |
| 2020/0173409 | A1 | 6/2020 | Benanti et al. |
| 2023/0220998 | A1 | 7/2023 | Bucaro et al. |
| 2023/0417155 | A1 | 12/2023 | Malkus et al. |

OTHER PUBLICATIONS

Zhang et al., "Broadband and low frequency sound absorption by sonic black holes with Micro-perforated boundaries," Journal of Sound and Vibration, published Aug. 2021, 11 pages.
United States Patent and Trademark Office, "Notice of Allowance and Fee(s) Due," issued in connection with U.S. Appl. No. 18/420,337, issued on Jul. 3, 2024, 10 pages.

* cited by examiner

ACOUSTIC DAMPING DEVICE

RELATED APPLICATION

This patent arises from a continuation of U.S. patent application Ser. No. 18/420,337, filed on Jan. 23, 2024. U.S. patent application Ser. No. 18/420,337 is hereby incorporated herein by reference in its entirety. Priority to U.S. patent application Ser. No. 18/420,337 is hereby claimed.

FIELD OF THE DISCLOSURE

This disclosure relates generally to acoustic damping and, more particularly, to an acoustic damping device for a gas turbine engine.

BACKGROUND

During operation, aircraft engines, automobile engines, generators, etc., produce vibrations. Vibration-producing devices can include additional hardware structures to dissipate resonant frequencies caused by the vibrations, as such frequencies can cause damage to the vibration-producing device.

DETAILED DESCRIPTION

Figure 1:
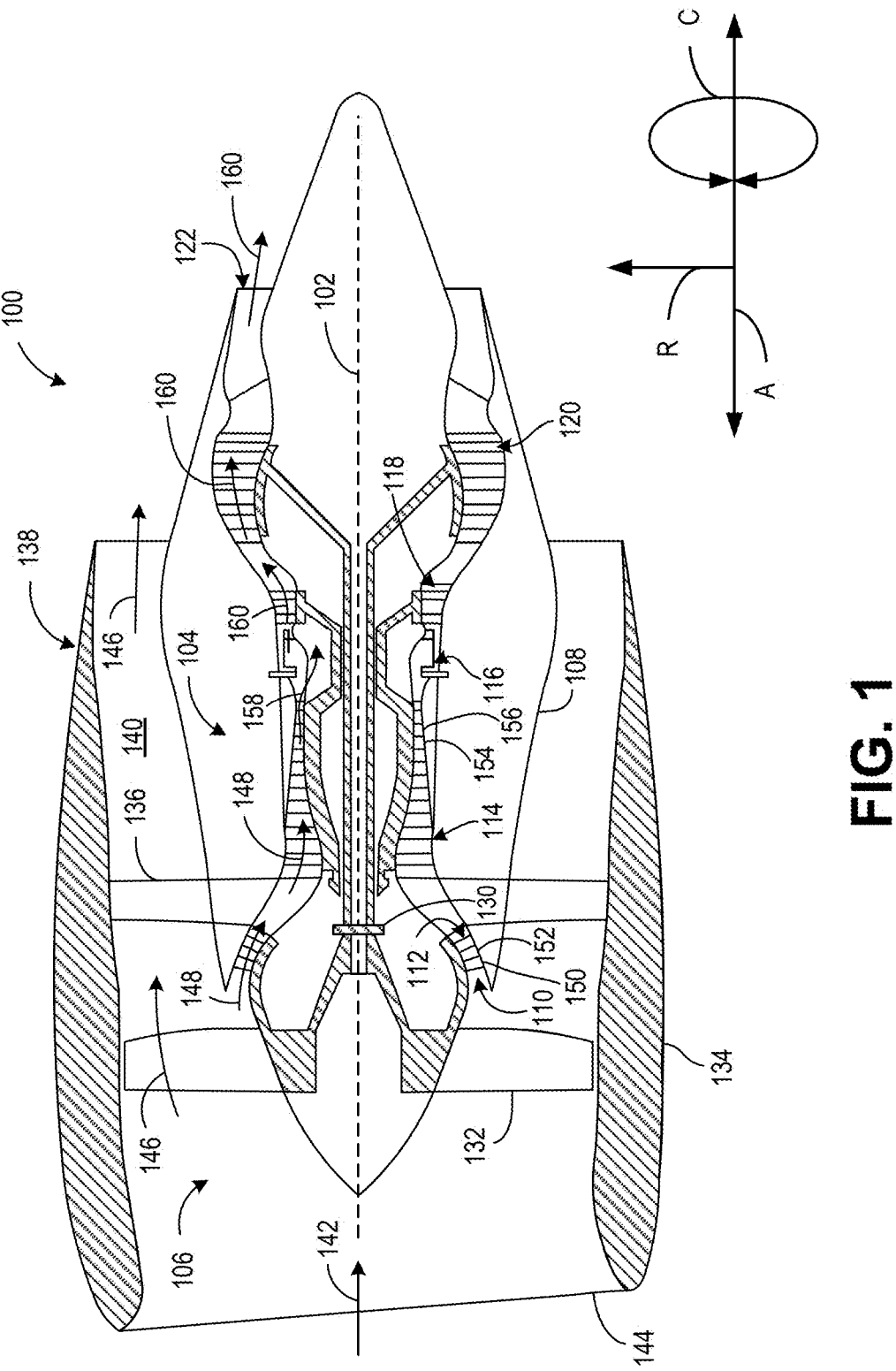
FIG. 1 is a cross-sectional view of an example gas turbine engine in which examples disclosed herein may be implemented.

In general, the same reference numbers will be used throughout the drawing(s) and accompanying written description to refer to the same or like parts. The figures are not necessarily to scale. Instead, the thickness of the layers or regions may be enlarged in the drawings. Although the figures show layers and regions with clean lines and boundaries, some or all of these lines and/or boundaries may be idealized. In reality, the boundaries and/or lines may be unobservable, blended, and/or irregular.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc., may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, or (7) A with B and with C. As used herein in the context of describing structures, components, items, objects and/or things, the phrase "at least one of A and B" is intended to refer to implementations including any of (1) at least one A, (2) at least one B, or (3) at least one A and at least one B. Similarly, as used herein in the context of describing structures, components, items, objects and/or things, the phrase "at least one of A or B" is intended to refer to implementations including any of (1) at least one A, (2) at least one B, or (3) at least one A and at least one B. As used herein in the context of describing the performance or execution of processes, instructions, actions, activities, etc., the phrase "at least one of A and B" is intended to refer to implementations including any of (1) at least one A, (2) at least one B, or (3) at least one A and at least one B. Similarly, as used herein in the context of describing the performance or execution of processes, instructions, actions, activities, etc., the phrase "at least one of A or B" is intended to refer to implementations including any of (1) at least one A, (2) at least one B, or (3) at least one A and at least one B.

As used herein, singular references (e.g., "a", "an", "first", "second", etc.) do not exclude a plurality. The term "a" or "an" object, as used herein, refers to one or more of that object. The terms "a" (or "an"), "one or more", and "at least one" are used interchangeably herein. Furthermore, although individually listed, a plurality of means, elements, or actions may be implemented by, e.g., the same entity or object. Additionally, although individual features may be included in different examples or claims, these may possibly be combined, and the inclusion in different examples or claims does not imply that a combination of features is not feasible and/or advantageous.

As used herein, unless otherwise stated, the term "above" describes the relationship of two parts relative to Earth. A first part is above a second part, if the second part has at least one part between Earth and the first part. Likewise, as used herein, a first part is "below" a second part when the first part is closer to the Earth than the second part. As noted above, a first part can be above or below a second part with one or more of: other parts therebetween, without other parts therebetween, with the first and second parts touching, or without the first and second parts being in direct contact with one another.

As used herein, connection references (e.g., attached, coupled, connected, and joined) may include intermediate members between the elements referenced by the connection reference and/or relative movement between those elements unless otherwise indicated. As such, connection references do not necessarily infer that two elements are directly connected and/or in fixed relation to each other. As used herein, stating that any part is in "contact" with another part is defined to mean that there is no intermediate part between the two parts.

Unless specifically stated otherwise, descriptors such as "first," "second," "third," etc., are used herein without imputing or otherwise indicating any meaning of priority, physical order, arrangement in a list, and/or ordering in any way, but are merely used as labels and/or arbitrary names to distinguish elements for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for identifying those elements distinctly within the context of the discussion (e.g., within a claim) in which the elements might, for example, otherwise share a same name.

Turbine engines are some of the most widely-used power generating technologies, often being utilized in aircraft and power-generation applications, for example. A turbine engine generally includes a fan positioned forward of a core, which includes, in serial flow order, a compressor section (e.g., including one or more compressors), a combustion section, a turbine section (e.g., including one or more turbines), and an exhaust section. A turbine engine can take on any number of different configurations. For example, a turbine engine can include one or more compressors and turbines, single or multiple spools, ducted or unducted fans, geared architectures, etc. In some examples, the fan and a low pressure compressor are on the same shaft as a low pressure turbine and a high pressure compressor is on the same shaft as a high pressure turbine.

In operation, rotating blades of the fan pull atmospheric air into the turbine engine and impel the air downstream. At least a portion of the air enters the core, where the air is compressed by rotating blades of a compressor, combined with fuel and ignited to generate a flow of a high-temperature, high-pressure gas (e.g., hot combustion gas), and fed to the turbine section. The hot combustion gases expand as they flow through the turbine section, causing rotating blades of the turbine(s) to spin. Each of these processes produce vibrations within the turbine engine that can transfer into fuel flowing through the turbine engine and/or create pressure fluctuations, thus causing flow instabilities within the fuel and/or cause acoustic oscillations within a combustion chamber within the turbine engine.

In platforms such as automobile engines, generators, etc., vibrations are also generated due to operation of those platforms (e.g., through igniting fuel, spinning electric motors, etc.). While the examples disclosed herein are targeted towards the platform of aircraft turbine engines, the examples disclosed herein can be used in alternate platforms to cancel flow fluctuations and acoustic oscillations produced by any vibration-producing device.

Disclosed herein is an acoustic damping device that dampens/cancels flow instabilities and/or acoustic oscillations generated by vibration generating devices such as turbine engines, fuel manifolds, etc. The acoustic damping device disclosed herein absorbs the flow instabilities and/or acoustic oscillations generated and dissipates them within the structure of the acoustic damping device to reduce/eliminate those flow instabilities and/or acoustic oscillations from affecting operability of the component/device. The acoustic damping device disclosed herein is structured/sized and/or tailored to wavelength frequencies to dissipate or cancel flow instabilities and/or acoustic oscillations (referred to, for example, as an acoustic black hole).

FIG. 1 is a schematic cross-sectional view of an example high-bypass turbofan-type gas turbine engine 100. While the illustrated example is a high-bypass turbofan engine, the principles of the present disclosure are also applicable to other types of engines, such as low-bypass turbofans, turbojets, turboprops, etc. As shown in FIG. 1, the turbine engine 100 defines a longitudinal or axial centerline axis 102 extending therethrough for reference. FIG. 1 also includes an annotated directional diagram with reference to an axial direction A, a radial direction R, and a circumferential direction C. In general, as used herein, the axial direction A is a direction that extends generally parallel to the centerline axis 102, the radial direction R is a direction that extends orthogonally outwardly from the centerline axis 102, and the circumferential direction C is a direction that extends concentrically around the centerline axis 102.

In general, the turbine engine 100 includes a core turbine 104 disposed downstream from a fan (e.g., fan section) 106. The core turbine 104 includes a substantially tubular outer casing 108 that defines an annular inlet 110. The outer casing 108 can be formed from a single casing or multiple casings. The outer casing 108 encloses, in serial flow relationship, a compressor section having a booster or low pressure compressor 112 ("LP compressor 112") and a high pressure compressor 114 ("HP compressor 114"), a combustion section 116, a turbine section having a high pressure turbine 118 ("HP turbine 118") and a low pressure turbine 120 ("LP turbine 120"), and an exhaust section 122.

As shown in FIG. 1, the fan 106 includes a plurality of fan blades 132 coupled to and extending radially outwardly from the centerline axis 102. A nacelle 134 (also referred to as an annular fan casing 134) circumferentially encloses the fan 106 and/or at least a portion of the core turbine 104. The nacelle 134 can be supported relative to the core turbine 104 by a plurality of circumferentially-spaced apart outlet guide vanes 136. Furthermore, a downstream section 138 of the nacelle 134 can enclose an outer portion of the core turbine 104 to define a bypass airflow passage 140 therebetween.

As illustrated in FIG. 1, air 142 enters an inlet portion 144 of the turbine engine 100 during operation thereof. A first portion 146 of the air 142 flows into the bypass airflow passage 140, while a second portion 148 of the air 142 flows into the inlet 110 of the LP compressor 112. One or more sequential stages of LP compressor stator vanes 150 and LP compressor rotor blades 152 progressively compress the second portion 148 of the air 142 flowing through the LP compressor 112 en route to the HP compressor 114. Next, one or more sequential stages of HP compressor stator vanes 154 and HP compressor rotor blades 156 further compress the second portion 148 of the air 142 flowing through the HP compressor 114. This provides compressed air 158 to the combustion section 116 where the compressed air 158 mixes with fuel and burns to provide combustion gases 160.

Along with the gas turbine engine 100, the core turbine 104 serves a similar purpose and is exposed to a similar environment in land-based gas turbines, turbojet engines in which the ratio of the first portion 146 of the air 142 to the second portion 148 of the air 142 is less than that of a turbofan, and unducted fan engines in which the fan 106 is devoid of the nacelle 134. In each of the turbofan, turbojet, and unducted engines, a speed reduction device (e.g., a reduction gear 130) can be included between any shafts and spools.

Operation of the turbine engine 100 of FIG. 1 generates flow instabilities in fuel lines and/or acoustic oscillations due to pressure differences from operation of the turbine engine 100. In some examples, operation of the turbine engine 100 vibrates fuel flowing through fuel lines. In some examples, the combustion of the fuel in the combustion section 116 generates acoustic oscillations due to the chemical reaction of igniting the fuel (e.g., pressure differences). It should be understood that many alternative scenarios can result in the generation of vibrations during operation of the turbine engine 100 of FIG. 1 and the preceding examples are merely to provide context to place the disclosed systems, apparatus, articles of manufacture, and methods in an example environment.

In some examples, an acoustic damping device is disposed within a fuel manifold of the gas turbine engine 100 of FIG. 1. In some examples, the acoustic damping device is disposed within the combustion section 116 of the gas turbine engine 100. In other examples, the acoustic damping device is disposed anywhere that acoustic vibrations are generated that can be damped such as within the LP compressor 112, the HP compressor 114, the exhaust section 122, the bypass airflow passage 140, etc.

Figure 2:
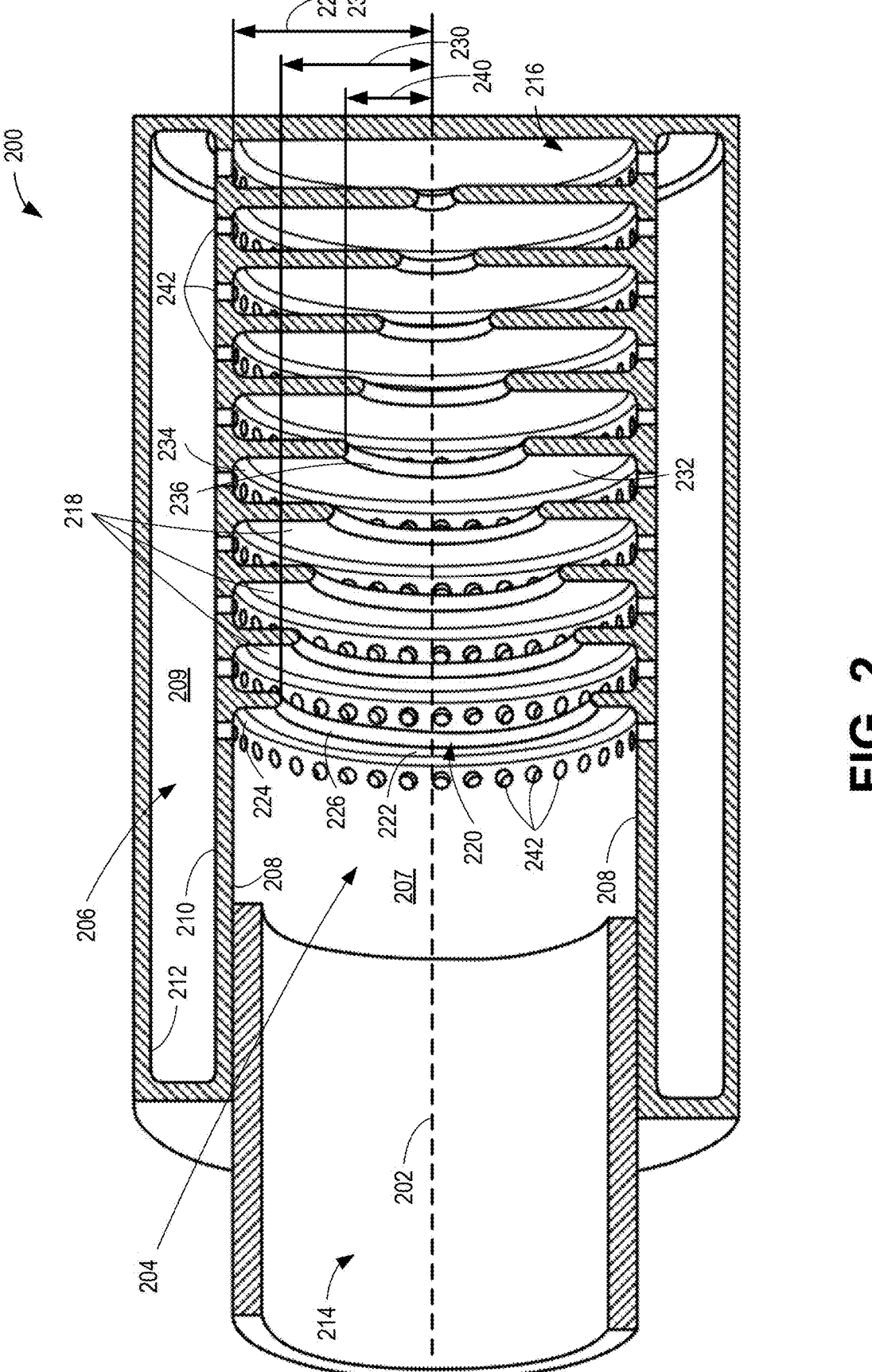
FIG. 2 is a partial cross-sectional view of a first example acoustic damping device.

FIG. 2 is partial a cross-sectional view of a first example acoustic damping device 200. The first example acoustic damping device 200 includes a centerline 202, a first channel 204, and a second channel 206. In the example of FIG. 2, the first channel 204 corresponds to a first volume 207. The first volume 207 is defined by a first channel wall 208 extending circumferentially about the centerline 202 in a cylindrical orientation minus any internal structures. The first channel wall 208 is also referred to herein as an outer wall of the first channel 204.

The second channel 206 surrounds the first channel 204 and corresponds to a second volume 209. In some examples, the second channel 206 is adjacent to the first channel 204. The second channel 206 includes a second channel inner wall 210 and a second channel outer wall 212. As shown in the example of FIG. 2, the second channel inner wall 210 and the first channel wall 204 represent opposite sides of a single wall structure. The distance between the first channel wall 204 and the second channel inner wall 210 represents a thickness of the wall structure. The second volume 209 is defined by the volume in between the second channel inner wall 210 and the second channel outer wall 212 minus any internal structures within the second channel 206. In some examples, the distance between the second channel inner wall 210 and the second channel outer wall 212 is 0.36 inches, with a tolerance margin of 0.05 inches. Further, in some examples, a length of the second channel 206 is equal to 1.2 inches, with a tolerance margin of 0.05 inches. In some examples, the first channel 204 is shorter in length than the second channel 206. In examples disclosed herein, the second channel 206 is separated from the first channel 204 via a distance between the first channel wall 208 and the second channel inner wall 210 (e.g., the thickness of the wall structure).

In some examples, first volume 207 is larger than the second volume 209. In some examples, a first plurality of discs 218, the corresponding first channel 204, and the second channel 206 are sized according to a volume ratio to achieve a desired response to vibrations generated. The volume ratio is defined as a relationship of the second volume 209 to the first volume 207. In examples disclosed herein, the volume ratio has a range from 0.1 to 1.0, representing the ratio of the second volume 209 to the first volume 207. More generally, the length of the first channel 204 and/or the second channel 206 can be expressed as a function of the radius of the discs 218. In examples disclosed herein, the length of the first channel 204 and/or the second channel 206 is anywhere from 10 times the radius of the discs 218 up to 50 times the radius of the discs 218.

The volume ratio is determined to target certain frequencies and pressures experienced within the first example acoustic damping device 200. In some examples, a higher volume ratio (e.g., a volume ratio closer to 1.0) results in dissipating/cancelling lower frequencies. Likewise, a lower volume ratio (e.g., a volume ratio closer to 0.1) results in dissipating/cancelling higher frequencies.

As illustrated in FIG. 2, the first channel 204 includes a first end 214 and a second end 216. In operation, when implemented with the example gas turbine engine 100 of FIG. 1, fuel or acoustic oscillations enter the first example acoustic damping device 200 through the first end 214. The fuel/acoustic oscillations travel through the first channel 204 to the second end 216. In the examples disclosed herein, the second end 216 is closed (e.g., sealed) and the fuel/acoustic oscillations do not exit the first example acoustic damping device 200 through the second end 216.

In the example of FIG. 2, the first plurality of discs 218 are oriented within the first channel 204. In the example of FIG. 2, nine discs 218 are illustrated. However, it should be understood that more or fewer discs 218 can be present. The discs 218 extend from the second end 216 of the first channel 204 towards the first end 214 of the first channel 204. In the example of FIG. 2, the discs 218 are washer-shaped (e.g., circular) and include an opening 220 centered on the centerline 202 and extending from the centerline 202 radially outward towards the discs 218. As noted above, the first volume 207 is defined by the volume of the first channel 204 minus any internal structures. Thus, the first volume 207 is the volume of the first channel 204 minus the volume consumed by the discs 218.

As illustrated in FIG. 2, the discs 218 funnel towards the second end 216 from the first end 214. For example, a first disc 222 includes a first disc outer edge 224 and a first disc inner edge 226. In the examples disclosed herein, the first disc outer edge 224 is flush/aligned/connected with the first channel wall 208. The first disc 222 has a first radius 228 from the centerline 202 to the first disc outer edge 224 and a second radius 230 from the centerline 202 to the first disc inner edge 226. In some examples, the first radius 228 and the second radius 230 are sized according to the location and configuration of the acoustic damping device 200 (e.g., the turbine engine 100, internal combustion engine, etc.). In examples disclosed herein, the first radius 228 and the second radius 230 can be expressed as a ratio of the second radius 230 to the first radius 228. For example, the ratio of the second radius 230 to the first radius 228 can be from 0.04 to 0.97. In some examples, the first radius 228 is 0.5 inches and the second radius 230 is 0.43 inches with a tolerance margin of 0.05 inches.

Further in the example of FIG. 2, a second disc 232 includes a second disc outer edge 234 and a second disc inner edge 236. In the examples disclosed herein, the second disc outer edge 234 is flush/aligned/connected with the first channel wall 208. The second disc 232 has a third radius 238 equal to the first radius 228 corresponding to a distance from the centerline 202 to the second disc outer edge 234 (e.g., 0.5 inches). The second disc 232 has a fourth radius 240 from the centerline 202 to the second disc inner edge 236. Similar to the first disc 222 described above, the third radius 238 and the fourth radius 240 of the second disc 232 can be expressed as a ratio of the fourth radius 240 to the third radius 238. For example, the ratio of the fourth radius 240 to the third radius 238 can be from 0.04 to 0.97. In some examples, the fourth radius 240 is equal to 0.33 inches, with a tolerance margin of 0.05 inches. In other examples, the fourth radius 240 is sized according to the location and configuration of the acoustic damping device 200. In some examples, an inner radius of the discs 218 decreases linearly towards the second end 216. In other examples, the inner radius changes exponentially, quadratically, etc.

In the examples disclosed herein, the sizing of the discs 218 correspond to operating conditions to which the first example acoustic damping device 200 are subjected. For example, acoustic oscillations change based on ambient conditions, performance, and/or flight stage of the gas turbine engine 100. Such examples include higher operating speeds of the gas turbine engine 100, higher operating temperatures (e.g., a low altitude flight, a hot or cold day, stormy day with high atmospheric pressure/disturbances, etc.), cruise, takeoff, climb, etc. In operation, as fluid/acoustic oscillations enter the first end 214 and travel to the second end 216, the discs 218 dissipate/cancel the oscillations generated through the sizing and spacing of the discs 218 within the first channel 204. In some examples, the second radius 230 and the fourth radius 240 are sized according to a mathematical relationship such as a linear function, a logarithmic function, a parabolic/power law function, etc.

To further dissipate/cancel these oscillations, a plurality of apertures 242 are arranged within the first channel 204 along the first channel wall 208 and between the discs 218. The plurality of apertures 242 allow fluid/acoustic oscillations to transfer between the first channel 204 and the second channel 206. In some examples, the apertures 242 are circular in shape and have a diameter sized according to a location and configuration of the acoustic damping device 200 (e.g., in the turbine engine 100). For example, the diameter of the apertures 242 are sized based on a spacing between the discs 218. In some examples, the spacing between the discs 218 can be expressed as a percentage of the first radius 228. In such an example, the spacing of the discs 218 can be from 10% of the first radius 228 up to 120% of the first radius 228. Therefore, the diameter of the apertures 242 are sized to fit within the distance between the discs 218. In some examples, the plurality of apertures 242 have a diameter of 0.02 inches.

In operation, allowing the fluid/acoustic oscillations to transfer between the channels 204, 206 increases efficiency in dissipating/cancelling acoustic oscillations by providing an additional volume within which to allow the oscillations to dissipate. For example, if the second channel 206 is not present, assume that the acoustic damping device 200 has an efficiency of 60% in reducing the amplitude of the acoustic oscillations. Adding the second channel 206 increases the efficiency to, for example, 90% since there is additional volume for which acoustic oscillations can dissipate.

Figure 3:
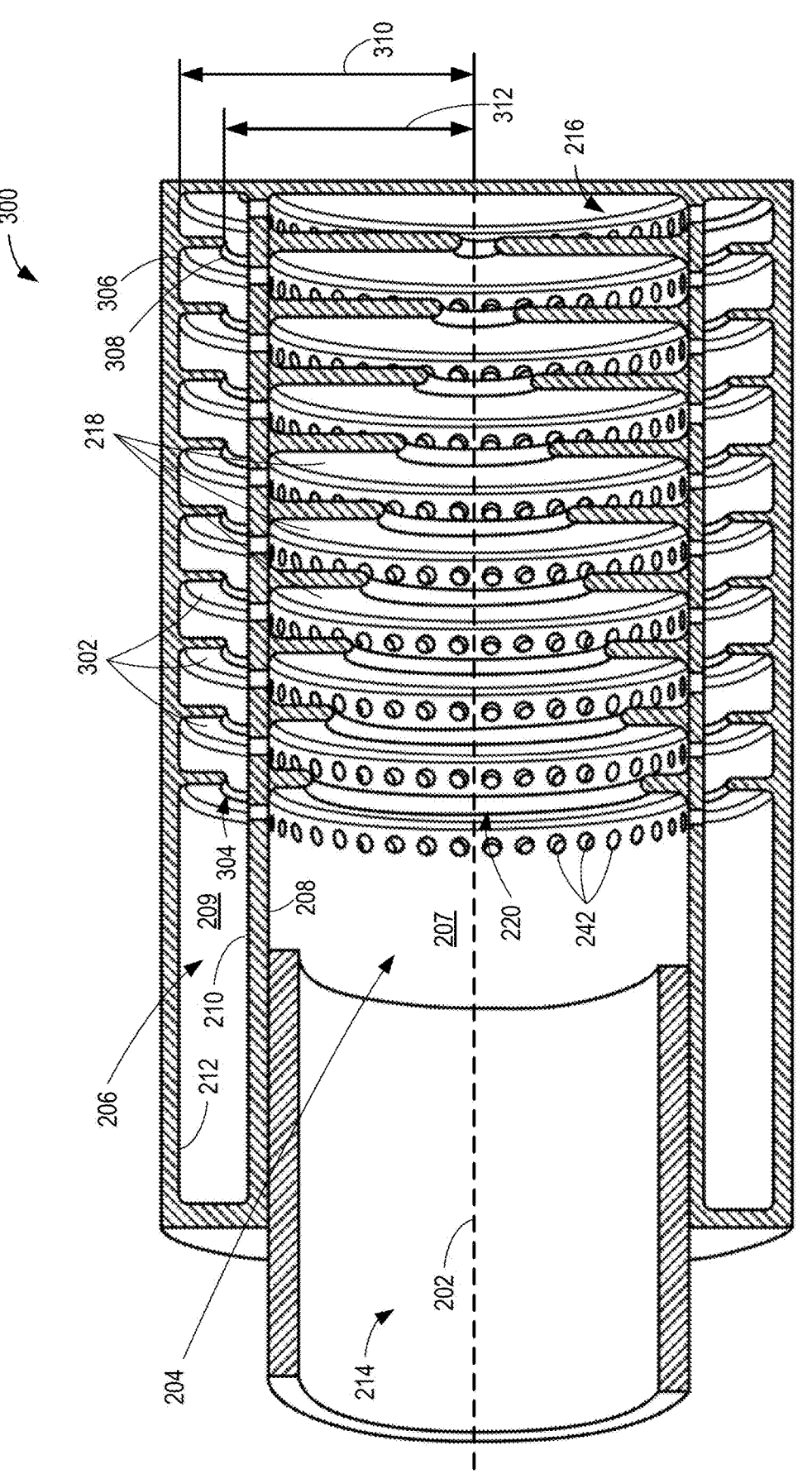
FIG. 3 is a partial cross-sectional view of a second example acoustic damping device.

FIG. 3 is partial a cross-sectional view of a second example acoustic damping device 300. The second example acoustic damping device 300 includes all of the components as described in connection with the first example acoustic damping device 200 of FIG. 2 and operates using the same physical process. However, as illustrated in FIG. 3, the second example acoustic damping device 300 includes a second plurality of discs 302 oriented within the second channel 206. As noted above, the second volume 209 is defined by the volume of the second channel 206 minus any internal structures. Thus, the second volume 209 of the example of FIG. 3 is the volume of the second channel 206 minus the volume consumed by the second discs 302.

In the example of FIG. 3, the second discs 302 are washer-shaped and include a second opening 304 that is bigger than the opening 220 of FIG. 2. The second opening 304 is centered on the centerline 202 just as the opening 220 of FIG. 2 is aligned with the centerline 202 and extends radially outward from the centerline 202 to the second discs 302. The second discs 302 of the example of FIG. 3 are larger than the discs 218 of FIG. 2.

Respective ones of the second discs 302 include an outer edge 306 and an inner edge 308. In the example of FIG. 3, the outer edge 306 of the second discs 302 are flush/aligned/connected with the second channel outer wall 212. The second discs 302 have a fifth radius 310 from the centerline 202 to the outer edge 306 of the second discs 302 and a sixth radius 312 from the centerline 202 to the inner edge 308 of the second discs 302. In examples disclosed herein, the fifth radius 310 and the sixth radius 312 can be expressed as a ratio of the fifth radius 310 and the sixth radius 312. For example, the ratio of fifth radius 310 and the sixth radius 312 can be from 0.04 to 0.97. In some examples, the fifth radius 310 is 0.88 inches. In other examples, the fifth radius 310 sized according to the location and configuration of the acoustic damping device 300. In some examples, the sixth radius 312 is equal to 0.7 inches, allowing a gap between the inner edge 308 and the second channel inner wall 210.

Inclusion of the second discs 302 in the second channel 206 allows for the dissipation/cancellation response of the second example acoustic damping device 300 to be more finely tuned. For example, increasing the number of discs (either the discs 218 or the second discs 302) can increase control of the frequencies that are to be dissipated/cancelled due to an increase in surfaces available to trap those oscillations. As stated above, the number of discs 218, 302 and the respective sizing of the discs 218, 302 can be modified as appropriate to tune the vibrational response accordingly. For example, increasing the amount of discs 218, 302 increases the range of frequencies that can be covered (e.g., increasing a maximum frequency from 1,000 Hz to 2,000 Hz or lowering the minimum frequency from 500 Hz to 100 Hz) and increases the efficiency in damping the acoustic oscillations (e.g., increase efficiency from 60% to 70% or more). Increasing the size of the discs 218, 302 naturally increases the volume of the acoustic damping devices 200, 300 and thus covers lower frequency ranges as disclosed above. Decreasing the size of the discs 218, 302 provides a lower volume and thus covers higher frequency ranges. Therefore, modifying the number of discs 218, 302 and modifying the size of the discs 218, 302 is variable depending on the range of frequencies desired to dissipate/cancel and dependent on a required size of the acoustic damping device 200, 300.

Although the example of FIG. 3 illustrates respective ones of the second discs 302 to be equal in size and shape, it should be understood that the second discs 302 can be sized and shaped similar to the discs 218 (e.g., exhibit a funnel shape). Therefore, the examples disclosed herein are not limited exclusively to those illustrated and may include a combination of the components disclosed throughout.

Figure 4:
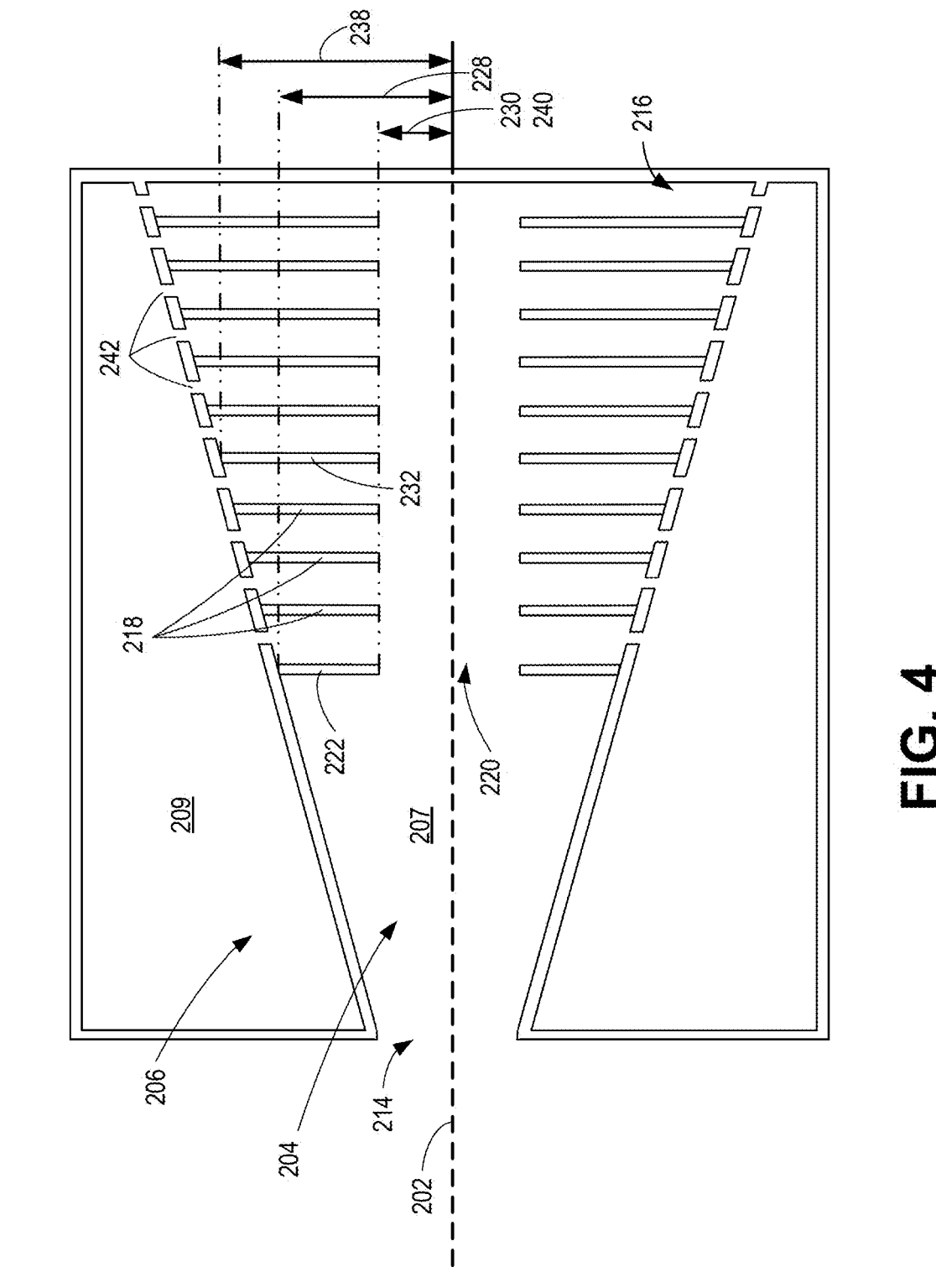
FIG. 4 is a cross-sectional view of a third example acoustic damping device.

FIG. 4 is a cross-sectional view of a third example acoustic damping device 400. The third example damping device 400 includes all of the components as described in connection with the first example acoustic damping device 200 of FIG. 2 and operates using the same physical process. However, as illustrated in FIG. 4, the third example acoustic damping device 400 is shaped and sized differently.

As illustrated in FIG. 4, the first radius 228 of the first disc 222 and the third radius 238 of the second disc 232 are not equal. In the example of FIG. 4, the second radius 230 of the first disc 222 and the fourth radius 240 of the second disc 232 are equal (e.g., 0.06 inches) and the third radius 238 is greater than the first radius 228 (e.g., the third radius 238 is equal to 0.33 inches and the first radius 228 is equal to 0.1 inches). Such an example reflects an inverse funnel shape where the first channel 204 gets bigger closer to the second end 216. Unlike the first channel 204, the second channel 206 in the example of FIG. 4 gets smaller closer to the second end 216.

As mentioned above, the sizing and shape of the discs 218, 302 are determined based on a desired response to vibrational frequencies experienced (e.g., anywhere between 100 Hertz (Hz) and 4,000 Hz). On the low end of the frequency range experienced (e.g., 100-1,000 Hz), the discs 218, 302 are sized smaller than those that can handle the higher frequency range (e.g., 1,000-2,000 Hz). For example, to increase the volume ratio to handle lower frequency ranges as disclosed in connection with FIG. 2, the discs 218 have a smaller radius to reduce the first volume 207 corresponding to the first channel 204. Alternatively, to decrease the volume ratio to handle higher frequency ranges, the discs 218 have a larger radius to increase the first volume 207 corresponding to the first channel 204. The example of FIG. 4 provides an alternative arrangement of the discs 218 that can be interchangeably used in combination with any of the examples provided herein.

In some examples, the acoustic damping devices 200, 300, 400 of FIGS. 2-4 are made of a metallic material such as aluminum, steel, titanium, etc. Notably, the placement of the acoustic damping devices 200, 300, 400 within the gas turbine engine 100 may alter the material of which the acoustic damping devices 200, 300, 400 is made. For example, if the acoustic damping devices 200, 300, 400 are disposed aft of the combustion section 116, the material may be titanium to withstand the heat generated by igniting fuel. Alternatively, a cooling method may be implemented to protect the acoustic damping devices 200, 300, 400 (see FIG. 11 below). In other scenarios where excessive heat is not generated, the material of the acoustic damping devices 200, 300, 400 can be a cheaper material such as aluminum or steel. In some examples, where weight is an important consideration, a lighter material such as aluminum is used to reduce the weight profile of the acoustic damping devices 200, 300, 400.

Figure 5:
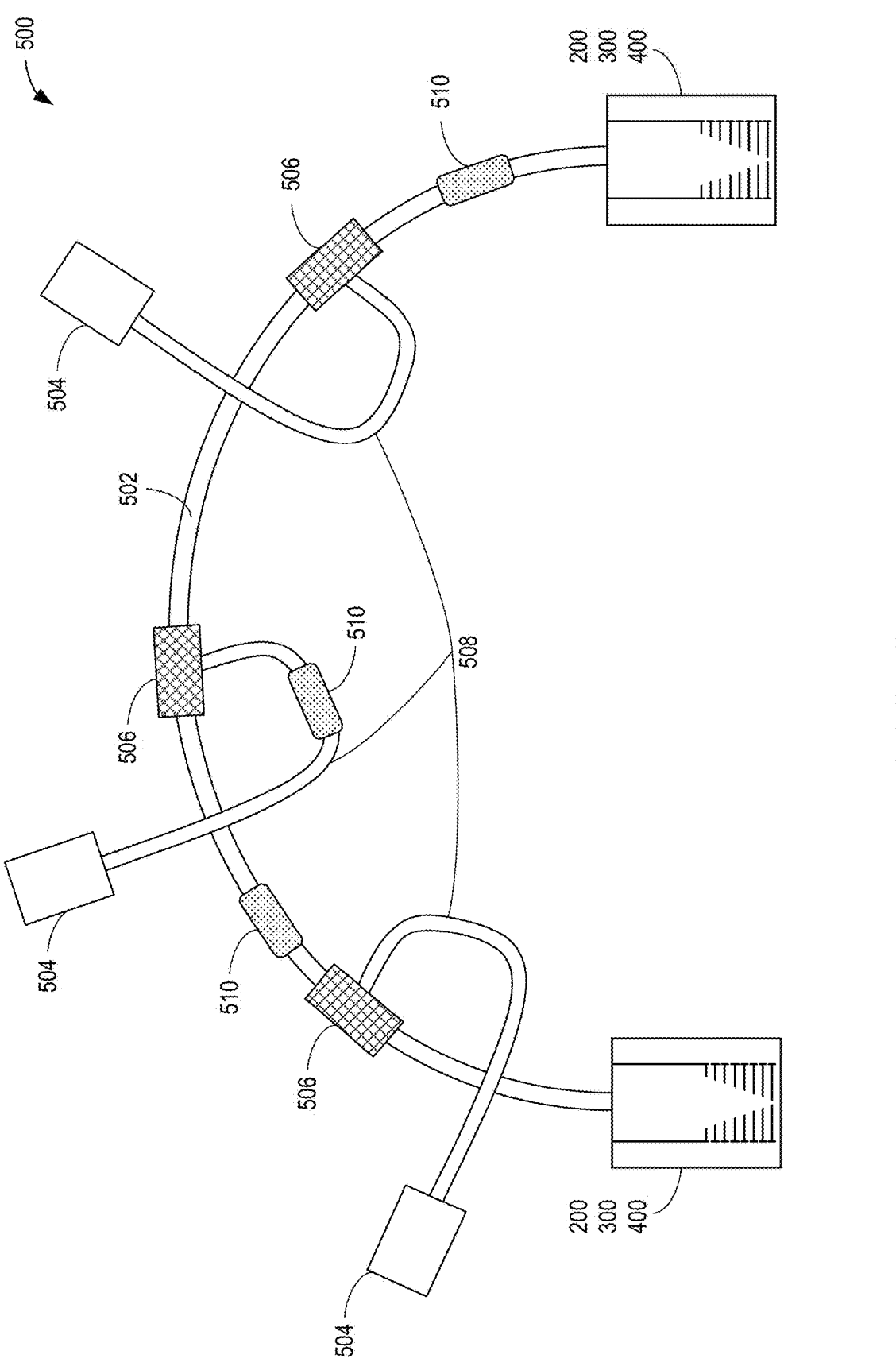
FIG. 5 is a schematic drawing of an example fuel manifold that can be implemented on the example gas turbine engine of FIG. 1 using any of the example acoustic damping devices of FIGS. 2-4.

FIG. 5 is a schematic drawing of an example fuel manifold 500 that can be implemented as part of the example gas turbine engine 100 of FIG. 1 using any of the example acoustic damping devices 200, 300, 400 of FIGS. 2-4. The example fuel manifold 500 includes a fuel line 502 to transport fuel from a fuel tank (not shown) to a fuel nozzle 504. The fuel nozzle 504 deposits fuel into the combustion section 116 to ignite the fuel as disclosed in connection with FIG. 1. As mentioned above, operation of the gas turbine engine 100 can cause flow instabilities in the fuel being transported through the fuel line 502 and therefore affect the operation of the fuel manifold 500 (e.g., become less efficient in transporting fuel, damage the fuel line 502, etc.). In an example environment such as the example gas turbine engine 100, multiple fuel lines 502 can be used independently of one another.

The example fuel manifold 500 includes fuel line junctions 506 to connect siphons 508 to the fuel nozzles 504. The siphons 508 deliver the appropriate amount of fuel from the fuel line 502 to the fuel nozzles 504. The fuel line junctions 506 allow some of the fuel to feed into the siphons 508 while allowing the remaining portion of the fuel to continue through the fuel line 502. In some examples, the siphons 508 are also referred to as "pigtails".

In the example of FIG. 5, the example fuel manifold 500 includes tubular damping devices 510 oriented along the fuel line 502 and the siphons 508 to dampen oscillations caused by flowing fuel. In some examples, the tubular damping devices 510 utilize existing damping techniques to dampen the flow instabilities within a fuel line caused by operation of the gas turbine engine 100.

As illustrated in the example of FIG. 5, the acoustic damping device 200, 300, 400 is oriented at ends of the fuel line 502. In examples disclosed herein, the fuel line 502 is pressurized to facilitate moving fuel through the fuel line 502. Therefore, the acoustic damping device 200, 300, 400 is oriented at the ends of the fuel line 502 where the pressure is greatest due to stagnation of the fuel flow. At the same location, the flow instabilities are also greatest due to the same stagnation of the fuel flow. Therefore, including the acoustic damping device 200, 300, 400 at the ends of the fuel line 502 provides improved damping characteristics and flow instability cancelling according to the details disclosed herein.

Figures 6A, 6B, 6C:
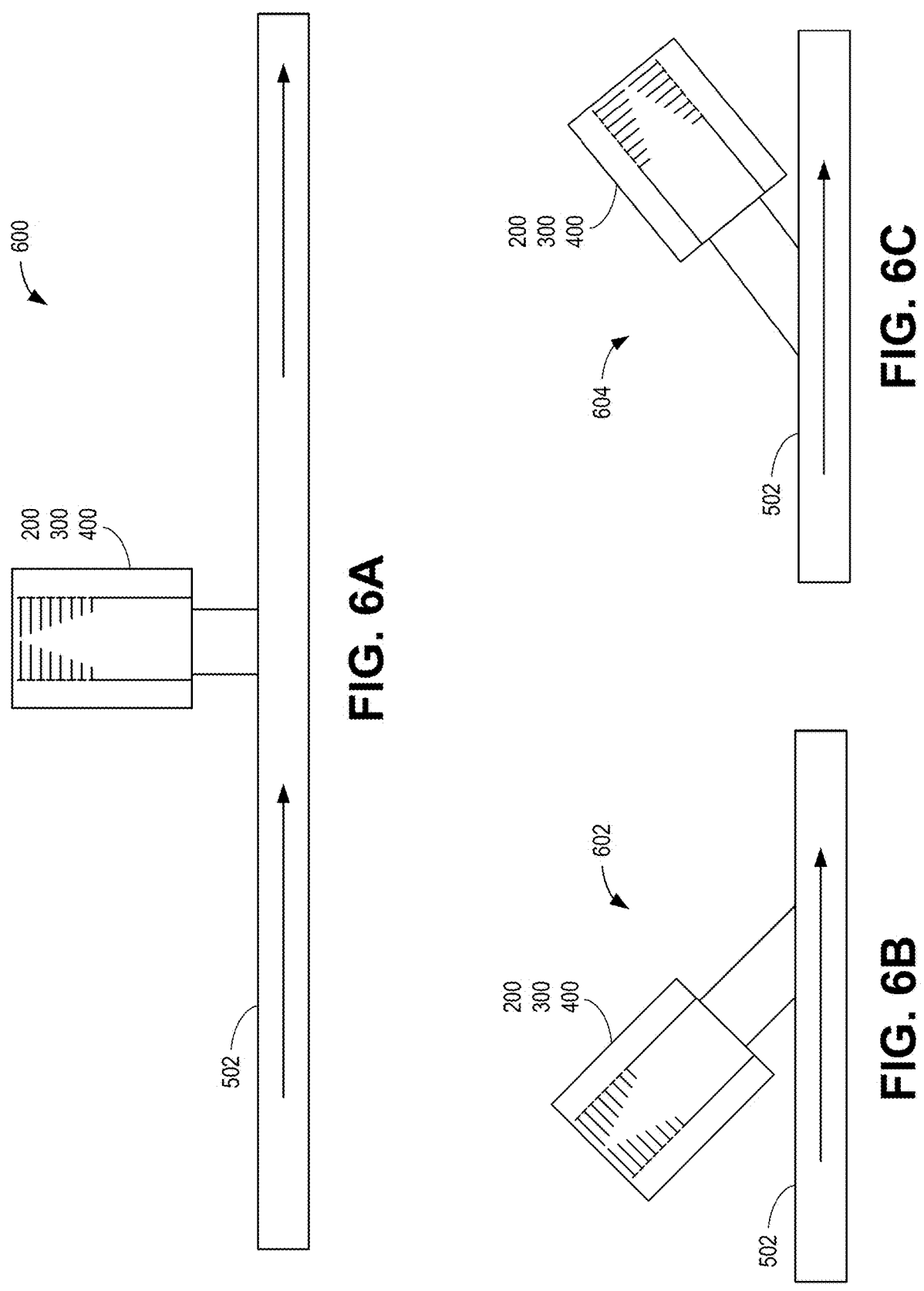
FIGS. 6A-6C show schematic drawings of example placements of the example acoustic damping devices of FIGS. 2-4 on the example fuel manifold of FIG. 5.

FIGS. 6A-6C shows schematic drawings of alternate example placements of the example acoustic damping devices 200, 300, 400 of FIGS. 2-4 on the example fuel manifold 500 of FIG. 5. In the examples of FIGS. 6A-6C, the acoustic damping device 200, 300, 400 are oriented along the fuel line 502 of the example fuel manifold 500. As indicated by the arrows in FIGS. 6A-6C, fuel flows in one direction through the fuel line 502.

FIG. 6A shows a T-junction orientation 600. The example of FIG. 6A illustrates the acoustic damping device 200, 300, 400 at a 90 degree angle with respect to the flow of the fuel through the fuel line 502. The T-junction orientation 600 allows fuel (or any oscillation generated) to enter the acoustic damping device 200, 300, 400 and dissipate the vibrations/reduce pressure build-up before releasing the fuel back into the fuel line 502 to continue to the fuel nozzles 504.

FIG. 6B shows an acute orientation 602. The example of FIG. 6B illustrates the acoustic damping device 200, 300, 400 at an angle less than 90 degrees with respect to the flow of the fuel through the fuel line 502. Similarly, the fuel can enter the acoustic damping device 200, 300, 400 in the acute orientation 602 to dissipate/cancel flow instabilities.

FIG. 6C shows an obtuse orientation 604. The example of FIG. 6C illustrates the acoustic damping device 200, 300, 400 at an angle greater than 90 degrees with respect to the flow of fuel through the fuel line 502.

The examples of FIGS. 6A-C are meant to illustrate potential orientations of the acoustic damping device 200, 300, 400 on the example fuel manifold 500 due to sizing constraints within any given environment. For example, if the fuel manifold 500 is to fit within a smaller footprint, the T-junction orientation 600 may not be able to fit the sizing constraints. Therefore, the acute orientation 602 or the obtuse orientation 604 may be used to accommodate the smaller footprint.

In some examples, the example acoustic damping devices 200, 300, 400 are oriented to combine the teaching disclosed herein with a Helmholtz resonator along a fuel line, exhaust line, etc. In such an example, the example acoustic damping devices 200, 300, 400 provide the structural improvements to dissipate/cancel flow instabilities and acoustic oscillations while providing improved noise reduction corresponding to the Helmholtz resonator.

Figure 7:
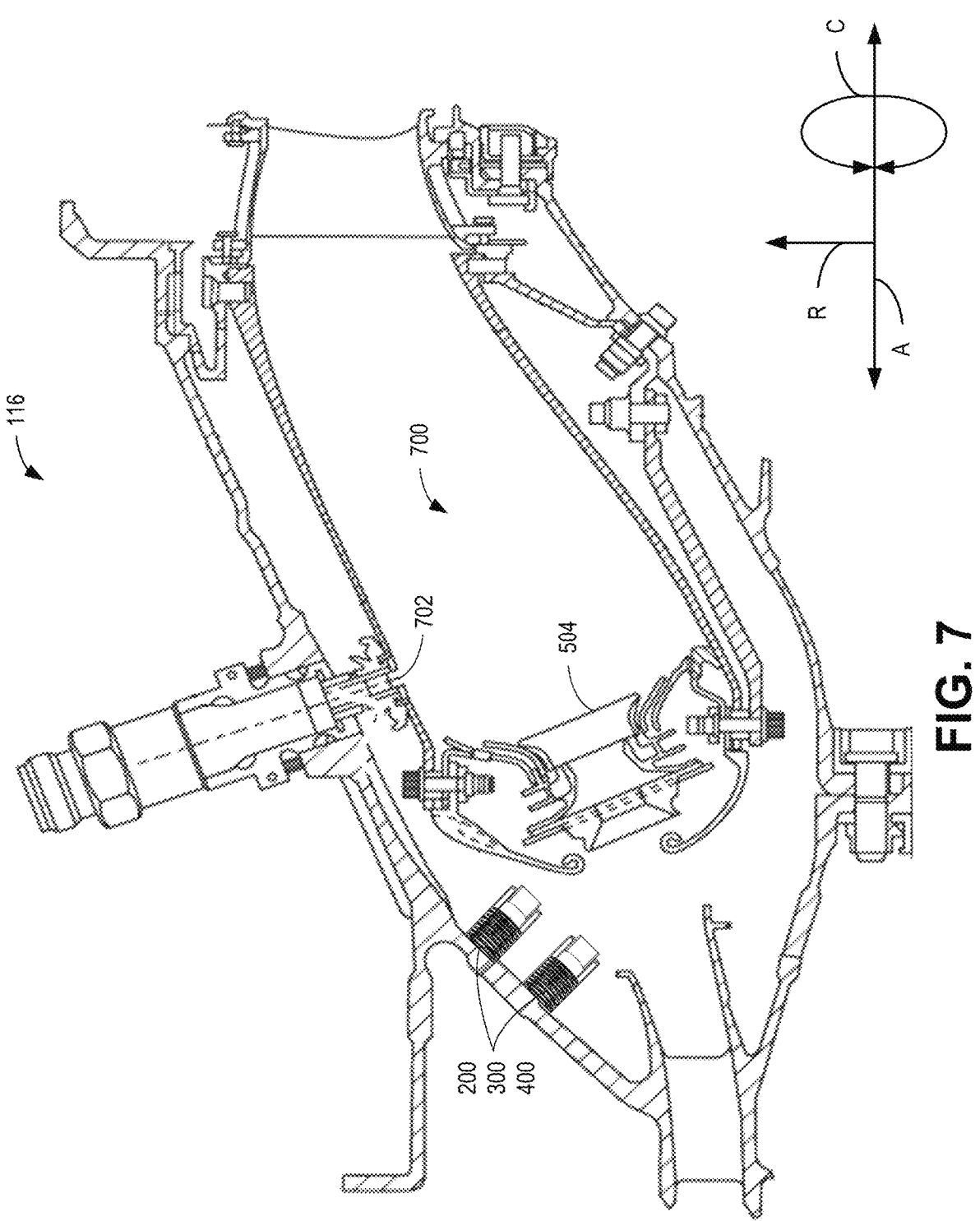
FIG. 7 is a cross-sectional view of an example combustion section of the example gas turbine engine of FIG. 1 utilizing the example acoustic damping device of any of FIGS. 2-4.

FIG. 7 is a cross-sectional view of the example combustion section 116 of the example gas turbine engine 100 of FIG. 1 utilizing the example acoustic damping device 200, 300, 400 of FIGS. 2-4. In the example of FIG. 7, the fuel nozzle 504 deposits fuel into a combustion chamber 700. An igniter 702 ignites the fuel to ultimately produce thrust as described above.

When the fuel is ignited, vibrations are generated due to the chemical reaction of igniting fuel. These vibrations (e.g., acoustic oscillations) propagate throughout the combustion section 116 and the remainder of the gas turbine engine 100. Notably, the oscillations travel upstream, forward of the fuel nozzle 504 and can affect the surrounding structure.

In the example of FIG. 7, one or more acoustic damping devices 200, 300, 400 are disposed forward of the fuel nozzle 504 to dissipate/cancel these oscillations generated. In some examples, the amount of acoustic damping devices 200, 300, 400 disposed in the combustion section 116 is determined based on a size of the combustion section 116. In other examples, the amount of acoustic damping devices 200, 300, 400 is fixed (e.g., one per fuel nozzle 504, one for every other fuel nozzle 504, etc.). In some examples, the acoustic damping devices 200, 300, 400 can be placed circumferentially around the gas turbine engine 100 based on the combustion section 116 (e.g., through a circumferential combustion section). Although the example of FIG. 7 shows two of the acoustic damping devices 200, 300, 400, only one or more than two can be used accordingly.

Figure 8:
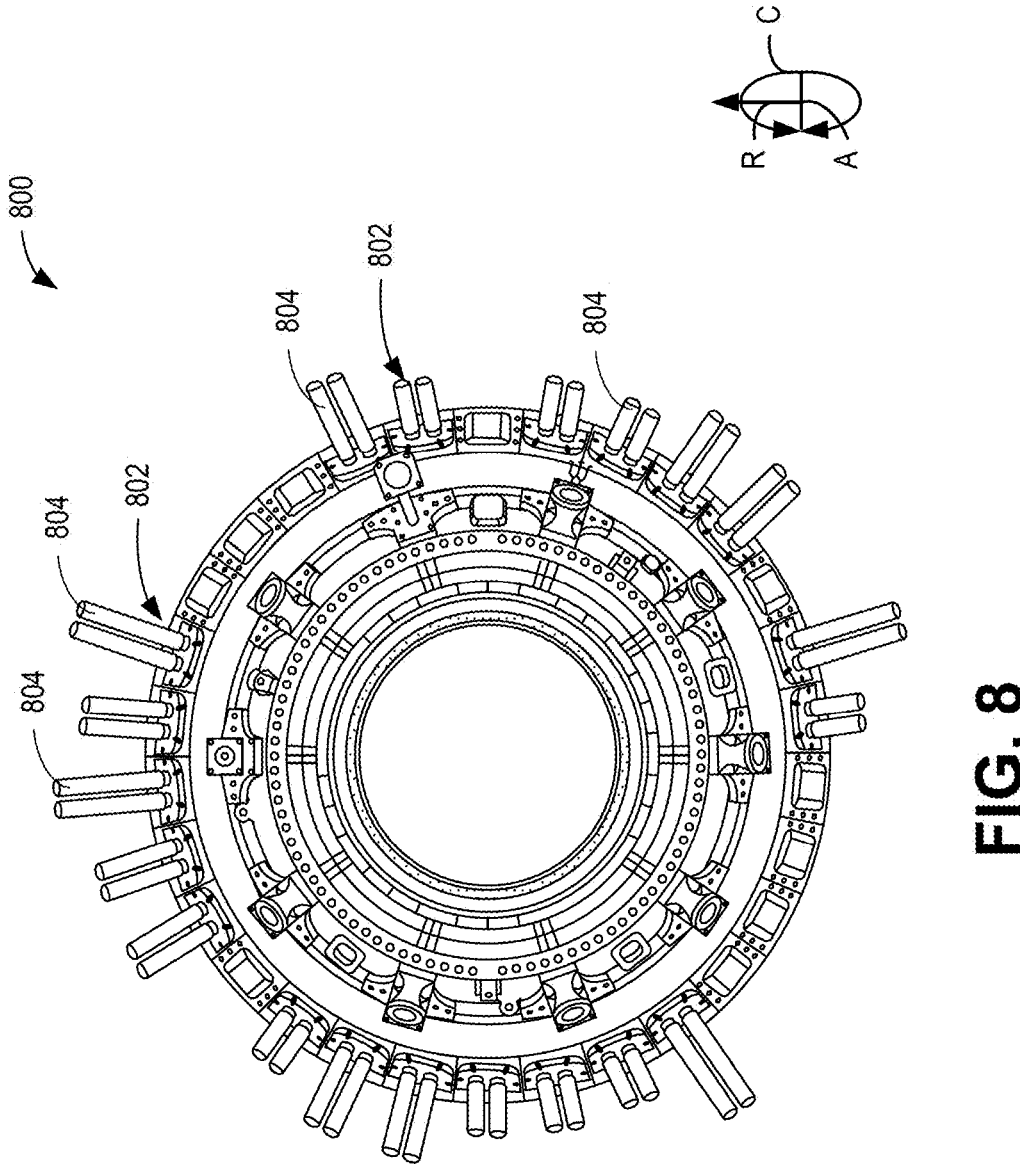
FIG. 8 is an example quarter wave tube combustion section which can be implemented on the example gas turbine engine of FIG. 1

FIG. 8 is an example quarter wave tube combustion section 800 which can be implemented on the example gas turbine engine 100 of FIG. 1. The example quarter wave tube combustion section 800 includes a plurality of combustion portions 802 dispersed circumferentially around the quarter wave tube combustion section 800. In operation, quarter wave tubes 804 extend from the combustion portions 802 to dissipate vibrational frequencies generated through the ignition of fuel. The quarter wave tubes 804 are sized and shaped according to anticipated frequency ranges experienced in the gas turbine engine 100. In operation, the quarter wave tubes 804 are tuned for a small range of frequencies (e.g., 100 Hz to 500 Hz).

Figure 9:
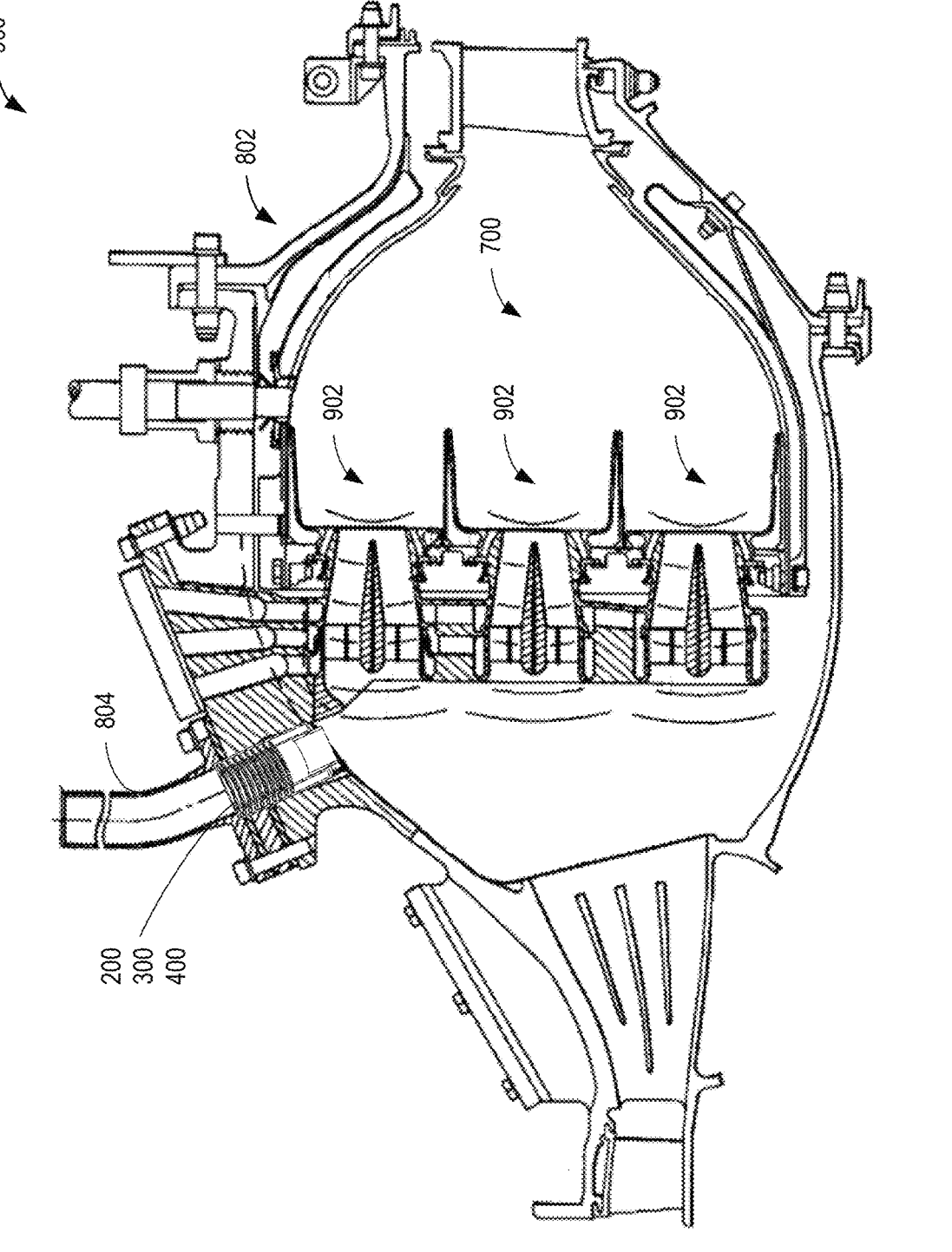
FIG. 9 is a first example arrangement of the acoustic damping device of FIGS. 2-4 in the example quarter wave tube combustion section of FIG. 8.

FIG. 9 is a first example arrangement 900 of the acoustic damping device 200, 300, 400 of FIGS. 2-4 in the example quarter wave tube combustion section 800 of FIG. 8. The example of FIG. 9 shows a cross-section of one of the combustion portions 802 of FIG. 8 including the quarter wave tube 804. Similar to the example of FIG. 7, the combustion portion 802 ignites fuel at an ignition section 902 within the combustion chamber 700. The reaction of igniting the fuel creates vibrational waves or acoustic oscillations that propagate throughout the combustion portion 802, both forward and aft.

As illustrated in the example of FIG. 9, the acoustic damping device 200, 300, 400 is disposed within the quarter wave tube 804 forward of the combustion chamber 700 to dissipate the oscillations generated. In some examples, the quarter wave tube 804 is omitted and only the acoustic damping device 200, 300, 400 is implemented to dissipate the oscillations. Such an arrangement may be desired where replacement of the combustion section 116, 800 is difficult, time consuming, expensive, etc., and insertion of the acoustic damping device 200, 300, 400 within the existing structure can improve performance. This approach also reduces/eliminates re-designing existing platforms to accommodate an increase in performance.

Figure 10:
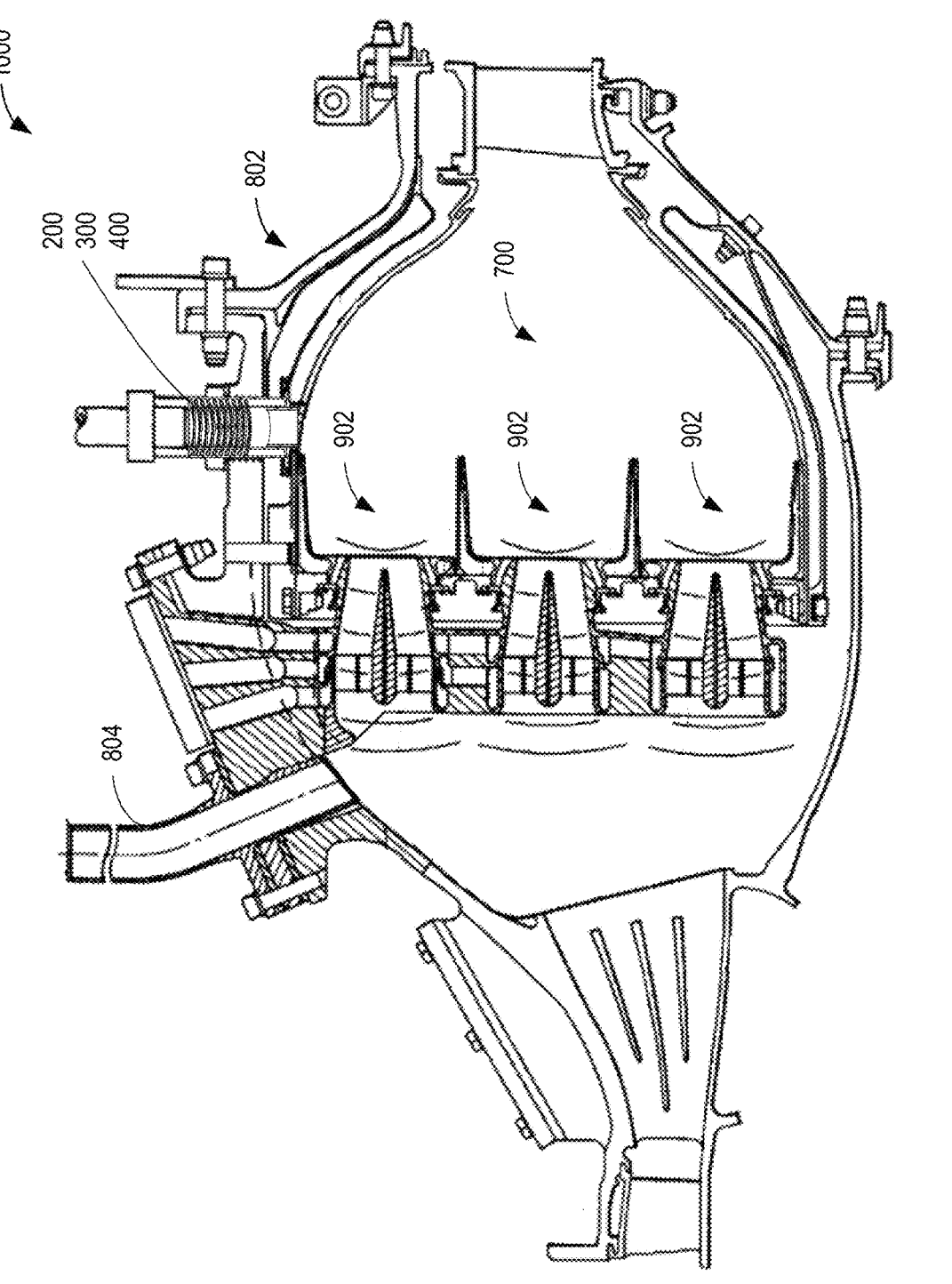
FIG. 10 is a second example arrangement of the acoustic damping device of FIGS. 2-4 in the example quarter wave tube combustion section of FIG. 8.

FIG. 10 is a second example arrangement 1000 of the acoustic damping device 200, 300, 400 of FIGS. 2-4 in the example quarter wave tube combustion section 800 of FIG. 8. The example of FIG. 10 shows a cross-section of one of the combustion portions 802 of FIG. 8 including the quarter wave tube 804. As illustrated in FIG. 10, the acoustic damping device 200, 300, 400 is disposed downstream (e.g., aft) of the ignition section 902 and adjacent to the combustion chamber 700.

The second example arrangement 1000 of FIG. 10 dissipates/cancels vibrational frequencies on a hot side of the combustion section 116 (FIG. 1) (e.g., aft of the ignition of fuel). The example of FIG. 10 allows for additional frequency response control corresponding to the oscillations generated through the ignition of the fuel. The first arrangement 900 and the second arrangement 1000 can be used independently or in combination to achieve a desired amount of oscillation dissipation (e.g., reducing overall vibrational effects and/or increasing efficiency in damping acoustic oscillations).

Figure 11:
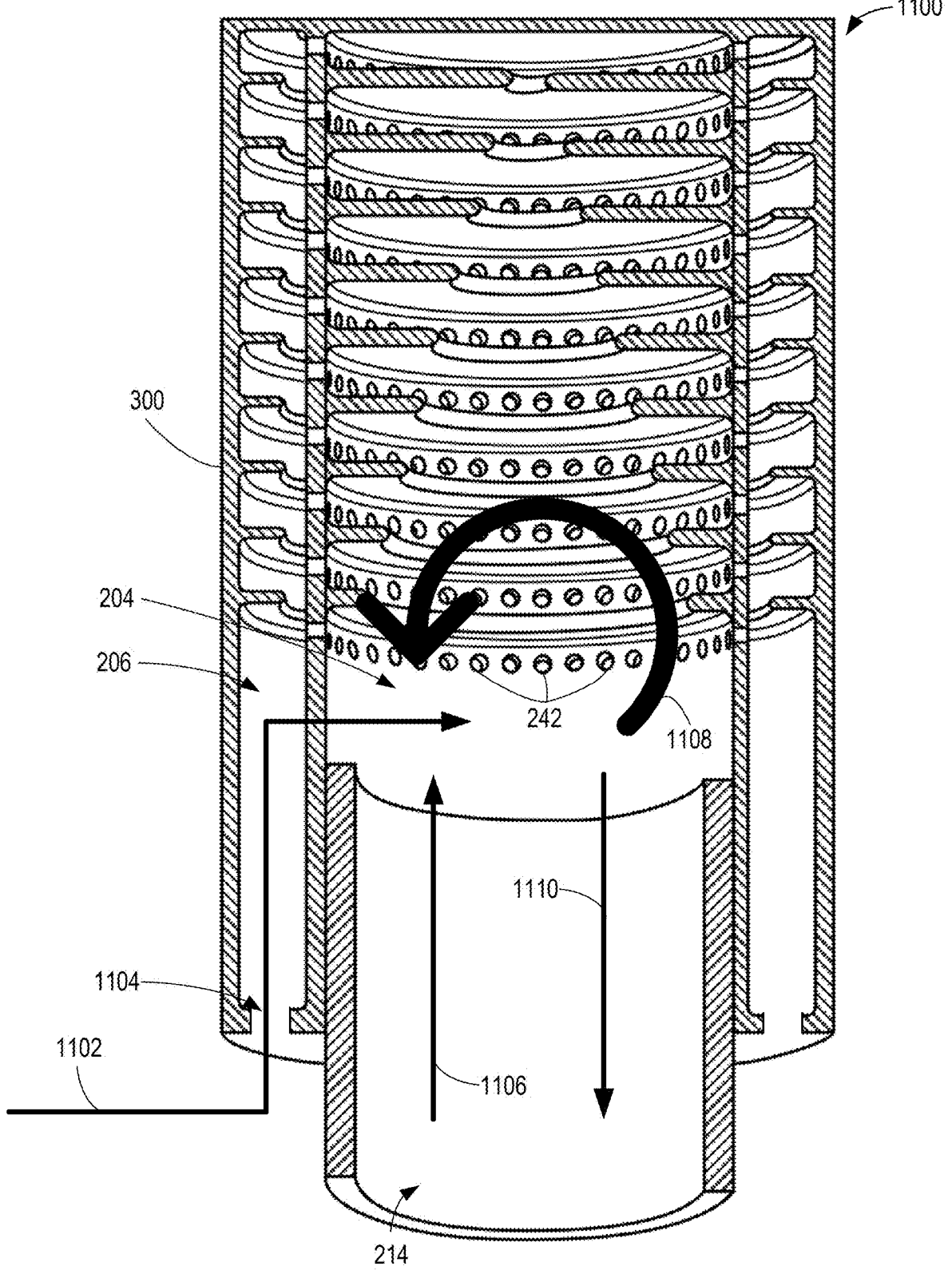
FIG. 11 illustrates an example cooling flow arrangement of the acoustic damping device of FIGS. 2-4 according to the second example arrangement of FIG. 10.

In operation, ignited fuel creates hot gases (e.g., exceeding 2,000 degrees Fahrenheit) that are subsequently pushed out of the exhaust section 122 (FIG. 1). These hot gases can damage components downstream that are not composed of materials that can withstand such temperatures. FIG. 11 illustrates an example cooling flow arrangement 1100 of the acoustic damping device 200, 300, 400 according to the second example arrangement 1000 of FIG. 10.

As a result, the second arrangement 1000 can be structured to mix cold, non-ignited air with the ignited gas to protect the acoustic damping device 200, 300, 400. Although the example of FIG. 11 shows the second example acoustic damping device 300, it should be understood that any of the example acoustic damping devices 200, 300, 400 of FIGS. 2-4 can be used herein.

As illustrated in FIG. 11, cold, non-ignited air 1102 enters the second channel 206 through a second channel opening 1104. The cold air 1102 then passes into the first channel 204 via the plurality of apertures 242. Hot, ignited gas 1106 enters the first channel 204 through the first end 214. The cold air 1102 is mixed with the hot gas 1106 in the first channel 204 (corresponding to arrow 1108) to create a mixed gas 1110. The mixed gas 1110 consists of the hot gas 1106 cooled down by the cold air 1102. The mixed gas 1110 is then expelled from the acoustic damping devices 200, 300, 400. This process of cooling the hot gas 1106 allows for the acoustic damping devices 200, 300, 400 to operate aft of the ignition section 902 (FIGS. 9 and 10).

From the foregoing, it will be appreciated that example systems, apparatus, articles of manufacture, and methods have been disclosed that utilize an acoustic damping device or acoustic black hole to dissipate and/or cancel vibrational frequencies, acoustic oscillations, and flow instabilities caused by vibration-generating devices. Failure to dissipate and/or cancel vibrational frequencies can lead to damage to components within an environment. Such damage could result in inoperability of the environment and/or reduced performance.

Example acoustic damping devices and related methods of use are disclosed herein. Further examples and combinations are provided by the subject matter of the following clauses:

An acoustic damping device comprising a first channel defining a first volume, the first channel open on a first end and closed on a second end, a second channel surrounding the first channel and defining a second volume, and a plurality of discs oriented within the first channel, respective discs of the plurality of discs including an opening in a center of the respective disc to allow at least one of a fluid or acoustic vibration to move from the first end to the second end, the first channel including a plurality of apertures dispersed along an outer wall of the first channel and between the plurality of discs, the apertures to facilitate transfer of at least one of the fluid or the acoustic vibration from the first channel to the second channel.

The acoustic damping device of the preceding clause, wherein a first disc of the plurality of discs on the first end of the first channel has a first radius from an outer edge of the first disc to the center and a second radius from an inner edge of the first disc to the center, and a second disc of the plurality of discs on the second end of the first channel has a third radius from an outer edge of the second disc to the center and a fourth radius from an inner edge of the second disc to the center, wherein the first radius and the third radius are equal.

The acoustic damping device of any preceding clause, wherein the second radius is larger than the fourth radius.

The acoustic damping device of any preceding clause, wherein the second radius is smaller than the fourth radius.

The acoustic damping device of any preceding clause, wherein the plurality of discs is a first plurality of discs, the opening is a first opening, the center is a first center, and the acoustic damping device further including a second plurality of discs oriented within the second channel, respective discs of the second plurality of discs including a second opening in a second center of the respective disc, the first center and the second center aligned.

The acoustic damping device of any preceding clause, wherein a first disc of the second plurality of discs on a first end of the second channel has a first radius from an outer edge of the first disc to the second center and a second radius from an edge of the second opening of the first disc to the second center, and a second disc of the second plurality of discs on a second end of the second channel has a third radius from an outer edge of the second disc to the second center and a fourth radius from an edge of the second opening of the second disc to the second center, wherein the first radius and the third radius are equal.

The acoustic damping device of any preceding clause, wherein the second radius and the fourth radius are equal.

The acoustic damping device of any preceding clause, wherein the first volume is larger than the second volume.

The acoustic damping device of any preceding clause, wherein a volume ratio of the second volume to the first volume is between 0.1 and 1.0.

A turbine engine having a centerline axis, the turbine engine comprising a nacelle, a combustion section surrounded by the nacelle, the combustion section including a combustion chamber aft of the combustion section along the centerline axis, and an acoustic damping device within the combustion section, the acoustic damping device including a first channel defining a first volume, the first channel open on a first end and closed on a second end, a second channel surrounding the first channel and defining a second volume, and a plurality of discs oriented within the first channel, respective discs of the plurality of discs including an opening in a center of the respective disc to allow acoustic vibration to move from the first end to the second end, the first channel including a plurality of apertures dispersed along an outer wall of the first channel and between the plurality of discs, the apertures to facilitate transfer of the acoustic vibration from the first channel to the second channel.

The turbine engine of any preceding clause, wherein the acoustic damping device is forward of the combustion section along the centerline axis.

The turbine engine of any preceding clause, wherein the acoustic damping device is aft of the combustion section along the centerline axis and adjacent to the combustion chamber.

The turbine engine of any preceding clause, further including a quarter wave tube at least one of aft of forward of the combustion section, wherein the acoustic damping device is placed within the quarter wave tube of the combustion section.

The turbine engine of any preceding clause, wherein a first disc of the plurality of discs on the first end of the first channel has a first radius from an outer edge of the first disc to the center and a second radius from an inner edge of the first disc to the center, and a second disc of the plurality of discs on the second end of the first channel has a third radius from an outer edge of the second disc to the center and a fourth radius from an inner edge of the second disc to the center, wherein the first radius and the third radius are equal.

The turbine engine of any preceding clause, wherein the second radius is larger than the fourth radius.

The turbine engine of any preceding clause, wherein the second radius is smaller than the fourth radius.

The turbine engine of any preceding clause, wherein the plurality of discs is a first plurality of discs, the opening is a first opening, the center is a first center, further including a second plurality of discs oriented within the second channel, respective discs of the second plurality of discs including a second opening in a second center of the respective disc, the first center and the second center aligned.

The turbine engine of any preceding clause, wherein a first disc of the second plurality of discs on a first end of the second channel has a first radius from an outer edge of the first disc to the second center and a second radius from an edge of the second opening of the first disc to the second center, and a second disc of the second plurality of discs on a second end of the second channel has a third radius from an outer edge of the second disc to the second center and a fourth radius from an edge of the second opening of the second disc to the second center, wherein the first radius and the third radius are equal.

The turbine engine of any preceding clause, wherein the second radius and the fourth radius are equal.

The turbine engine of any preceding clause, wherein the first volume is larger than the second volume.

The turbine engine of any preceding clause, wherein a volume ratio of the second volume to the first volume is between example 0.1 and 1.0.

A turbine engine comprising a nacelle, a combustion section within the nacelle, and a fuel manifold to transport fuel from a fuel tank to the combustion section, the combustion section to ignite the fuel, the fuel manifold including a fuel nozzle to deposit the fuel into the combustion section, a fuel line to transport the fuel from the fuel tank to the fuel nozzle, and an acoustic damping device coupled to a first portion of the fuel line, the acoustic damping device including a first channel defining a first volume, the first channel open on a first end and closed on a second end, a second channel surrounding the first channel and defining a second volume, and a plurality of discs oriented within the first channel, respective discs of the plurality of discs including an opening in a center of the respective disc to allow a fluid to move from the first end to the second end, the first channel including a plurality of apertures dispersed along an outer wall of the first channel and between the plurality of discs, the apertures to facilitate transfer of the fluid from the first channel to the second channel.

The turbine engine of any preceding clause, wherein the acoustic damping device is a first acoustic damping device, further including a second acoustic damping device coupled to a second portion of the fuel line, the second portion different than the first portion.

The turbine engine of any preceding clause, wherein a first disc of the plurality of discs on the first end of the first channel has a first radius from an outer edge of the first disc to the center and a second radius from an inner edge of the first disc to the center, and a second disc of the plurality of discs on the second end of the first channel has a third radius from an outer edge of the second disc to the center and a fourth radius from an inner edge of the second disc to the center, wherein the first radius and the third radius are equal.

The turbine engine of any preceding clause, wherein the second radius is larger than the fourth radius.

The turbine engine of any preceding clause, wherein the second radius is smaller than the fourth radius.

The turbine engine of any preceding clause, wherein the plurality of discs is a first plurality of discs, the opening is a first opening, the center is a first center, further including a second plurality of discs oriented within the second channel, respective discs of the second plurality of discs including a second opening in a second center of the respective disc, the first center and the second center aligned.

The turbine engine of any preceding clause, wherein a first disc of the second plurality of discs on a first end of the second channel has a first radius from an outer edge of the first disc to the second center and a second radius from an edge of the second opening of the first disc to the second center, and a second disc of the second plurality of discs on a second end of the second channel has a third radius from an outer edge of the second disc to the second center and a fourth radius from an edge of the second opening of the second disc to the second center, wherein the first radius and the third radius are equal.

The turbine engine of any preceding clause, wherein the second radius and the fourth radius are equal.

The turbine engine of any preceding clause, wherein the first volume is larger than the second volume.

The turbine engine of any preceding clause, wherein a volume ratio of the second volume to the first volume is between 0.1 and 1.0.

The turbine engine of any preceding clause, wherein the acoustic damping device is oriented at a 90 degree angle with respect to a flow direction of the fuel in the fuel manifold.

The turbine engine of any preceding clause, wherein the acoustic damping device is oriented at an angle between 0 degrees and 90 degrees with respect to a flow direction of the fuel in the fuel manifold.

The turbine engine of any preceding clause, wherein the acoustic damping device is oriented at an angle between 90 degrees and 180 degrees with respect to a flow direction of the fuel in the fuel manifold.

The turbine engine of any preceding clause, wherein the acoustic damping device is oriented at a first end of the fuel line.

The following claims are hereby incorporated into this Detailed Description by this reference. Although certain example systems, apparatus, articles of manufacture, and methods have been disclosed herein, the scope of coverage of this patent is not limited thereto. On the contrary, this patent covers all systems, apparatus, articles of manufacture, and methods fairly falling within the scope of the claims of this patent.

What is claimed is:

1. A fuel manifold of a gas turbine engine, the fuel manifold comprising:
a fuel line;
a fuel nozzle, the fuel line to transport fuel from a fuel tank to the fuel nozzle; and
an acoustic damping device fluidly coupled to the fuel line, the acoustic damping device including:
a first channel wall having a first end that is open and a second end that is closed, the first channel wall defining a first volume, the acoustic damping device including a first plurality of discs in the first volume and arranged along a centerline axis of the acoustic damping device, the first plurality of discs to damp at least one of a flow instability or an acoustic oscillation of the fuel; and
a second channel wall surrounding the first channel wall and defining a second volume between the first channel wall and the second channel wall, wherein the first channel wall includes a plurality of apertures to enable transfer of at least one of the fuel or the acoustic oscillation of the fuel from the first volume to the second volume.

2. The fuel manifold of claim 1, further including a second plurality of discs in the second volume and arranged along the centerline axis of the acoustic damping device, the second plurality of discs to further damp at least one of the flow instability or the acoustic oscillation of the fuel.

3. The fuel manifold of claim 1, wherein the acoustic damping device is located on a first end of the fuel line.

4. The fuel manifold of claim 3, wherein the acoustic damping device is a first acoustic damping device, the fuel manifold further including a second acoustic damping device located on a second end of the fuel line, the second end different than the first end.

5. The fuel manifold of claim 1, wherein the acoustic damping device is oriented at an angle between 0 degrees and 180 degrees with respect to a flow direction of the fuel in the fuel line.

6. The fuel manifold of claim 1, wherein each disc of the first plurality of discs has an outer edge and an inner edge, the outer edge and the inner edge defining a solid area of each disc therebetween, wherein each disc of the first plurality of discs has a continuously varying solid area.

7. A turbine engine comprising:
a nacelle;
a combustion section within the nacelle; and
a fuel manifold to transport fuel from a fuel tank to the combustion section, the combustion section to ignite the fuel, the fuel manifold including:
a fuel line to transport the fuel from the fuel tank to one or more fuel nozzles; and
an acoustic damping device fluidly coupled to a first portion of the fuel line, the acoustic damping device including:
a first channel defining a first volume, the first channel open on a first end and closed on a second end;
a second channel surrounding the first channel and defining a second volume; and
a plurality of discs in the first channel, the plurality of discs to allow the fuel to move from the first end to the second end to damp at least one of a flow instability or an acoustic oscillation of the fuel.

8. The turbine engine of claim 7, wherein the acoustic damping device is a first acoustic damping device, further including a second acoustic damping device fluidly coupled to a second portion of the fuel line, the second portion different than the first portion.

9. The turbine engine of claim 7, wherein the first volume is larger than the second volume.

10. The turbine engine of claim 7, wherein the acoustic damping device is oriented at a 90 degree angle with respect to a flow direction of the fuel in the fuel manifold.

11. The turbine engine of claim 7, wherein the acoustic damping device is oriented at an angle between 0 degrees and 90 degrees with respect to a flow direction of the fuel in the fuel manifold.

12. The turbine engine of claim 7, wherein the acoustic damping device is oriented at an angle between 90 degrees and 180 degrees with respect to a flow direction of the fuel in the fuel manifold.

13. The turbine engine of claim 7, wherein the fuel line is to transport the fuel from the fuel tank to the one or more fuel nozzles that deposit the fuel into the combustion section, and the acoustic damping device is oriented at a first end of the fuel line.

14. The turbine engine of claim 7, wherein each respective disc of the plurality of discs include an opening in a center of the respective disc to allow the fuel to move from the first end to the second end, the first channel includes a plurality of apertures dispersed along an outer wall of the first channel and between the plurality of discs, the plurality of apertures to facilitate a transfer of the fuel from the first channel to the second channel.

15. The turbine engine of claim 14, wherein a first disc of the plurality of discs on the first end of the first channel has a first radius from an outer edge of the first disc to the center and a second radius from an inner edge of the first disc to the center, and a second disc of the plurality of discs on the second end of the first channel has a third radius from an outer edge of the second disc to the center and a fourth radius from an inner edge of the second disc to the center, wherein the first radius and the third radius are equal.

16. The turbine engine of claim 15, wherein the second radius is larger than the fourth radius.

17. The turbine engine of claim 15, wherein the second radius is smaller than the fourth radius.

18. The turbine engine of claim 14, wherein the plurality of discs is a first plurality of discs, the opening is a first opening, the center is a first center, further including a second plurality of discs oriented within the second channel, each respective disc of the second plurality of discs including a second opening in a second center of the respective disc, the first center and the second center aligned.

19. The turbine engine of claim 18, wherein a first disc of the second plurality of discs on a first end of the second channel has a first radius from an outer edge of the first disc to the second center and a second radius from an inner edge of the second opening of the first disc to the second center, and a second disc of the second plurality of discs on a second end of the second channel has a third radius from an outer edge of the second disc to the second center and a fourth radius from an inner edge of the second opening of the second disc to the second center, wherein the first radius and the third radius are equal.

20. The turbine engine of claim 19, wherein the second radius and the fourth radius are equal.

* * * * *